United States Patent
Cloeren

(10) Patent No.: US 6,905,324 B2
(45) Date of Patent: Jun. 14, 2005

(54) INTERFACE CONTROL

(75) Inventor: Peter F. Cloeren, Orange, TX (US)

(73) Assignee: Cloeren Incorporated, Orange, TX (US)

( * ) Notice: Subject to any disclaimer, the term of this patent is extended or adjusted under 35 U.S.C. 154(b) by 240 days.

(21) Appl. No.: 10/132,517

(22) Filed: Apr. 26, 2002

(65) Prior Publication Data

US 2003/0201565 A1 Oct. 30, 2003

(51) Int. Cl.[7] ............................................. B29C 47/06
(52) U.S. Cl. ............................... 425/131.1; 425/133.5; 425/190; 425/380; 425/462; 264/173.12
(58) Field of Search ........................... 425/131.1, 133.5, 425/380, 462, 190; 264/173.12

(56) References Cited

U.S. PATENT DOCUMENTS

| | | | |
|---|---|---|---|
| 3,487,505 A | 1/1970 | Chisholm et al. | 425/133.5 |
| 3,557,265 A | 1/1971 | Chisholm et al. | |
| 3,759,647 A | 9/1973 | Schrenk et al. | |
| 3,773,882 A | 11/1973 | Schrenk | |
| 4,426,344 A | 1/1984 | Dinter et al. | 264/173.15 |
| 4,669,965 A * | 6/1987 | Murakami | 425/133.5 |
| 4,731,004 A | 3/1988 | Wenz, Jr. | 425/133.5 |
| 5,094,788 A | 3/1992 | Schrenk et al. | 264/173.15 |
| 5,094,793 A | 3/1992 | Schrenk et al. | 264/173.15 |
| 5,122,905 A | 6/1992 | Wheatley et al. | 359/586 |
| 5,269,995 A | 12/1993 | Ramanathan et al. | 264/173.12 |
| 5,389,324 A | 2/1995 | Lewis et al. | 264/173.12 |
| 5,516,474 A * | 5/1996 | Cloeren | 264/171.23 |
| 6,082,025 A | 7/2000 | Bonk et al. | 36/29 |

* cited by examiner

*Primary Examiner*—Benjamin L. Utech
*Assistant Examiner*—Joseph S. Del Sole
(74) *Attorney, Agent, or Firm*—Timothy R. Kroboth

(57) ABSTRACT

A method and apparatus for the extrusion of multilayered composite products, is provided. The inventive apparatus includes a coextrusion structure and a partition member. In accordance with the inventive method, the relative orientation of a first shaped flow stream and a second shaped flow stream to one another is changed, and the reoriented shaped streams are melt-laminated to produce a layered composite formed independent of division of a layered precursor stream. The reorientation occurs via a flow sequencer, which may be removably disposed. Beneficially, layered flow streams that differ from one another may be used. The coextrusion structure may advantageously include one or more removably disposed, flow-shaping inserts, and the partition member may be a removably disposed, partition plate.

21 Claims, 9 Drawing Sheets

INTERFACE CONTROL

FIELD OF THE INVENTION

This invention relates to the coextrusion of multilayered composite structures.

BACKGROUND OF THE INVENTION

As exemplified by U.S. Pat. No. 5,122,905 to Wheatley et al and U.S. Pat. No. 6,982,025 to Bonk et al, it is known to produce interdigitated streams, for instance, of an repetitive ABAB layer configuration, in which A and B are rheologically diverse from one another. Certain of these composites are disclosed as providing advantageous optical properties. In the Bonk et al patent, other composites are disclosed as benefitting gas barrier use, cushioning, and resistance against flex fatigue. These composites include microlayers, and it is disclosed that these composites can be made by coextrusion.

U.S. Pat. No. 4,426,344 to Dinter et al is directed to a coextrusion process that includes the formation of layered composite streams having continuous, but nonplanar interfaces, by profiling the contact surfaces of merging streams. In accordance with the process, Dinter et al form the layered composite streams in different planes, and thereafter reposition the streams from a stacked orientation to an edge-to-edge coplanar relationship while reducing width, prior to joining the streams laterally. Thereafter in accordance with the process, the resulting fluid mass is extruded from a downstream die as a multilayered product. FIG. 2 of Dinter et al illustrates multilayered product consisting of two joined halves, as indicated by the phantom line in the Figure.

U.S. Pat. No. 5,094,788 to Schrenk et al, U.S. Pat. No. 5,094,793 to Schrenk et al, and U.S. Pat. No. 5,269,995 disclose technology by which a shaped layered stream of discrete and continuous layers of diverse thermoplastic materials is used to generate a plurality of interfacial surfaces in a molten polymeric mass. In this type of prior art, a shaped layered stream flowing in a direction designated z of an x-y-z coordinate system, and including a generally planar interface that lies in the x-z plane, is divided into a plurality of branch streams. The division into branch streams is along the x-axis, and is generally parallel to the z-axis. The x-axis defines a transverse dimension of the interface. Thus, a plurality of branch streams is produced by dividing an interface of a shaped layered stream; and the term "branch streams" as used in this art, means layered streams derived by division of a layered precursor stream.

Thereafter, the branch streams are reoriented relative to the x-axis and the y-axis, so that the branch streams are in a stacked orientation in the y-direction. The reoriented branch streams are combined in an overlapping relationship to generate interdigitated streams including a plurality of interfacial surfaces.

The '788, '793 and '995 type of prior art also discloses independently adjusting the flow rates of branch streams, and dimensionally changing streams in the x-direction and y-direction. In addition, the '995 patent discloses the use of protective boundary layers to avoid layer instability and breakup at interfaces in microlayer coextrusion, and thereby avoid adverse effect on desired optical and/or mechanical properties.

A drawback of the '788 and '793 type of prior art is that in the case of layered streams with adjacent layers of diverse Theological properties, interface distortion and hence layer deformation or distortion, may result from, for instance, time dependent migration. A further drawback of this type of prior art is layer interfacial instability; the use of protective boundary layers as in the '995 type of prior art, adds additional layers that may not be desirable for, or necessarily benefit, the intended use.

In addition, in the '788, '793 and '995 type of prior art, the resultant composite structures are limited to interdigitated layered structures. Also, layer distortion can be expected to be relatively greater with relatively more mechanical manipulation of shaped layered streams.

Accordingly, there is a need particularly when processing diverse thermoplastic materials, to form composite structures with reduced interface distortion, and thereby reduced layer deformation and distortion. Furthermore, there is a need to eliminate, or minimize the development of, layer interfacial instability, and it is desirable to achieve such a result without reliance upon protective boundary layers. It is desirable not only to minimize mechanical manipulation of shaped layered streams, but also to improve microlayer coextrusion.

Also needed are multilayered composite products including layers of improved performance, for instance, improved barrier layer performance or reduced stress-cracking, and multilayered composite products of more varied layer composition. The composite structure may be useful as a barrier, for example, as a gas, moisture or flavor barrier. Improved barrier performance will for instance, benefit pressurized bladders for footwear, as well as be advantageous in packaging of varied types.

SUMMARY OF THE INVENTION

In accordance with the present invention, there is provided an improved method for producing a shaped layered composite having an interface defined by melt-lamination of flow streams. In accordance with the inventive method, the interface lies generally in an x-z plane of an x-y-z coordinate system, the x-axis defines a transverse dimension of the interface, and the y-axis extends generally perpendicularly through the interface.

In accordance with the inventive method, the relative orientation of a first shaped flow stream and a spaced apart, second shaped flow stream to one another, is changed, and the reoriented flow streams are combined. The first shaped flow stream may be a layered stream that includes at least one interface made by merging a first plurality of flow streams, and the second shaped flow stream may be a layered stream that includes at least one interface made by merging a second plurality of flow streams. By the term "plurality" is meant for purposes of this feature of the invention, two or more, including up to that needed for microlayer coextrusion. In accordance with the inventive method when forming a layered stream, a substantial difference in volumetric or mass flow rates of at least two of the streams being merged, may be used, if desired, to control the relative volume or mass of the layers.

Alternatively, either or both flow streams may be monolayer streams. In accordance with the inventive method, whether the flow streams being reoriented are layered streams or monolayer streams, the flow streams are suitably shaped for melt-lamination.

In accordance with the method, with the first shaped flow stream and the second shaped flow stream each having a main flow direction generally in a direction designated z of the x-y-z coordinate system, the flow streams are changed from a first relative orientation to a second relative orientation. In a preferred embodiment, the flow streams are reoriented from a generally side-by-side orientation along the x-axis to a generally stacked orientation in which the first shaped flow stream defines a first plane and the second shaped flow stream defines a second plane along the y-axis. In the generally side-by-side orientation, the flow streams may be in the same plane or in different planes. There may, of course, be additional flow streams.

Subsequently, the shaped layered composite is formed by melt-laminating the first shaped flow stream and the second shaped flow stream, thereby also generating the earlier-mentioned interface. In accordance with the inventive method and distinct from '788 type of prior art, the layered composite is formed independent of division of a layered precursor stream. Thus, the first shaped flow stream and second shaped flow stream can advantageously differ from one other not only in volume and layer thickness but when they are layered streams, also in other structure including but not limited to layer composition including layer sequencing. As indicated, additional streams may be melt-laminated to produce additional interfaces of the layered composite. In accordance with the inventive method, a substantial difference in volumetric or mass flow rates of the streams being melt-laminated may be used.

Thereafter, in accordance with the inventive method, this interface of the shaped layered composite is dimensionally increased along the x-axis to form a multilayered composite product of greater width than thickness in which this interface is generally parallel to the width. Illustrative products are multilayered sheet products. For purposes of this invention, the term "multilayered" includes product having at least two layers, and the term "sheet" includes, and thus should not be interpreted as excluding, product typically identified in the art as film.

Also provided by the present invention is an apparatus for producing a multilayered composite product. The apparatus includes in a preferred embodiment, a coextrusion structure partitioned into a first coextrusion substructure and a second coextrusion substructure, by a partition member. The first coextrusion substructure includes a first flow-shaping channel in fluid communication with a first flow convergence channel, and the partition member advantageously forms a wall portion of the first flow-shaping channel. Beneficially, the second coextrusion substructure includes a second flow-shaping channel and a third flow-shaping channel in fluid communication with a second flow convergence channel, and the partition member may also form a wall portion of the second flow-shaping channel. If desired, the partition member may have one or more stream-dividing walls.

In a second preferred embodiment, the inventive apparatus includes a first flow-shaping structure, a first flow-shaping channel in fluid communication with a flow convergence channel, and a partition member, and the first flow-shaping structure is partitioned by the partition member so as to comprise a second flow-shaping channel in fluid communication with the flow convergence channel, and a third flow-shaping channel. Beneficially in this embodiment, a coextrusion structure is formed by the first flow-shaping channel, the second flow-shaping channel, and the flow convergence channel, and the partition member may form a wall portion of the first flow-shaping channel.

In any case, the inventive apparatus may beneficially further include a removably disposed flow sequencer for changing relative flow stream orientation prior to melt-lamination of the streams. In accordance with the invention, inlets of a flow sequencer useful in the inventive apparatus, are disposed generally side-by-side.

The coextrusion structure may advantageously include one or more removable flow-shaping inserts, and the partition member may be a removable partition plate. Apparatus according to the invention, may further include an additional partition member or members.

Additional advantages and beneficial features of the present invention are set forth in the drawing and detailed description, and in part will become apparent to those skilled in the art upon examination of the drawing and detailed description or may be learned by practice of the invention. In the drawing and detailed description, preferred embodiments of the invention are shown and described by way of illustration of the best mode contemplated of carrying out this invention. As will be realized, this invention is capable of other and different embodiments, and its several details are capable of modification in various respects, all without departing from the invention. Accordingly, the drawing and the detailed description are to be regarded as illustrative in nature, and not as restrictive.

BRIEF DESCRIPTION OF THE DRAWING

Reference is now made to the accompanying drawing, which forms a part of the specification of the present invention.

DETAILED DESCRIPTION OF THE INVENTION

In accordance with the present invention, interface distortion and hence layer deformation and distortion are reduced. In addition, development of layer interfacial instability is minimized or may even be prevented, and this result may be accomplished without reliance upon protective boundary layers. Mechanical manipulation of shaped layered streams is reduced. Moreover, the present invention benefits microlayer coextrusion.

As a result of the invention, multilayered composite products including layers of improved performance are obtainable. In addition, multilayered composite products with more varied layers, are obtainable.

Figure 1:
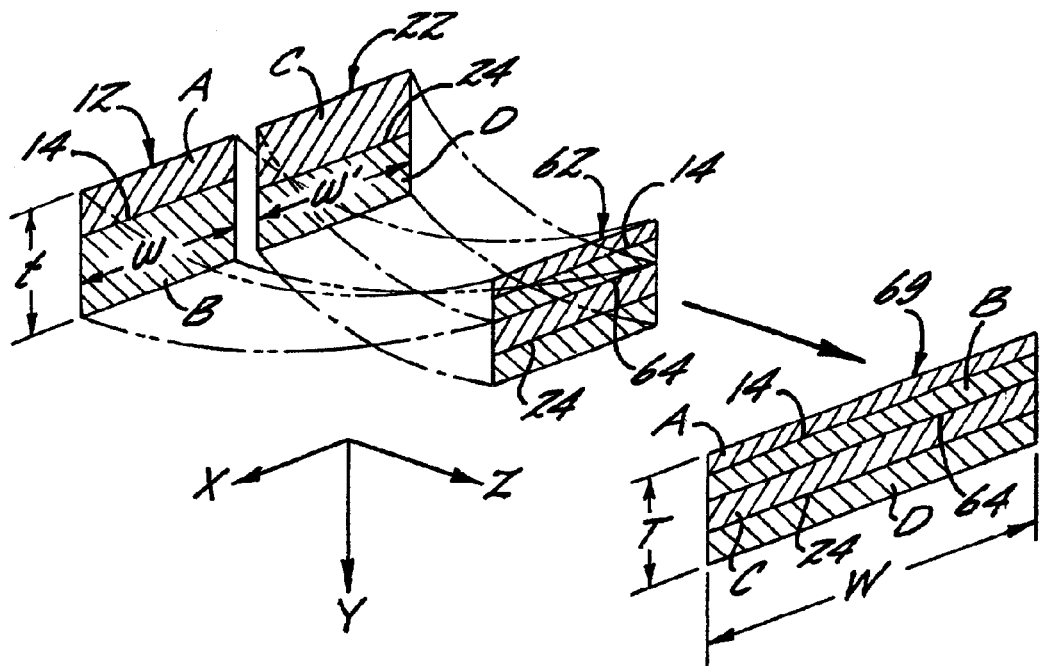
FIG. 1 depicts changing the relative orientation of shaped layered streams and melt-laminating the streams to produce a shaped layered composite, and thereafter producing a multilayered composite product, in accordance with the present invention.
Figure 2:
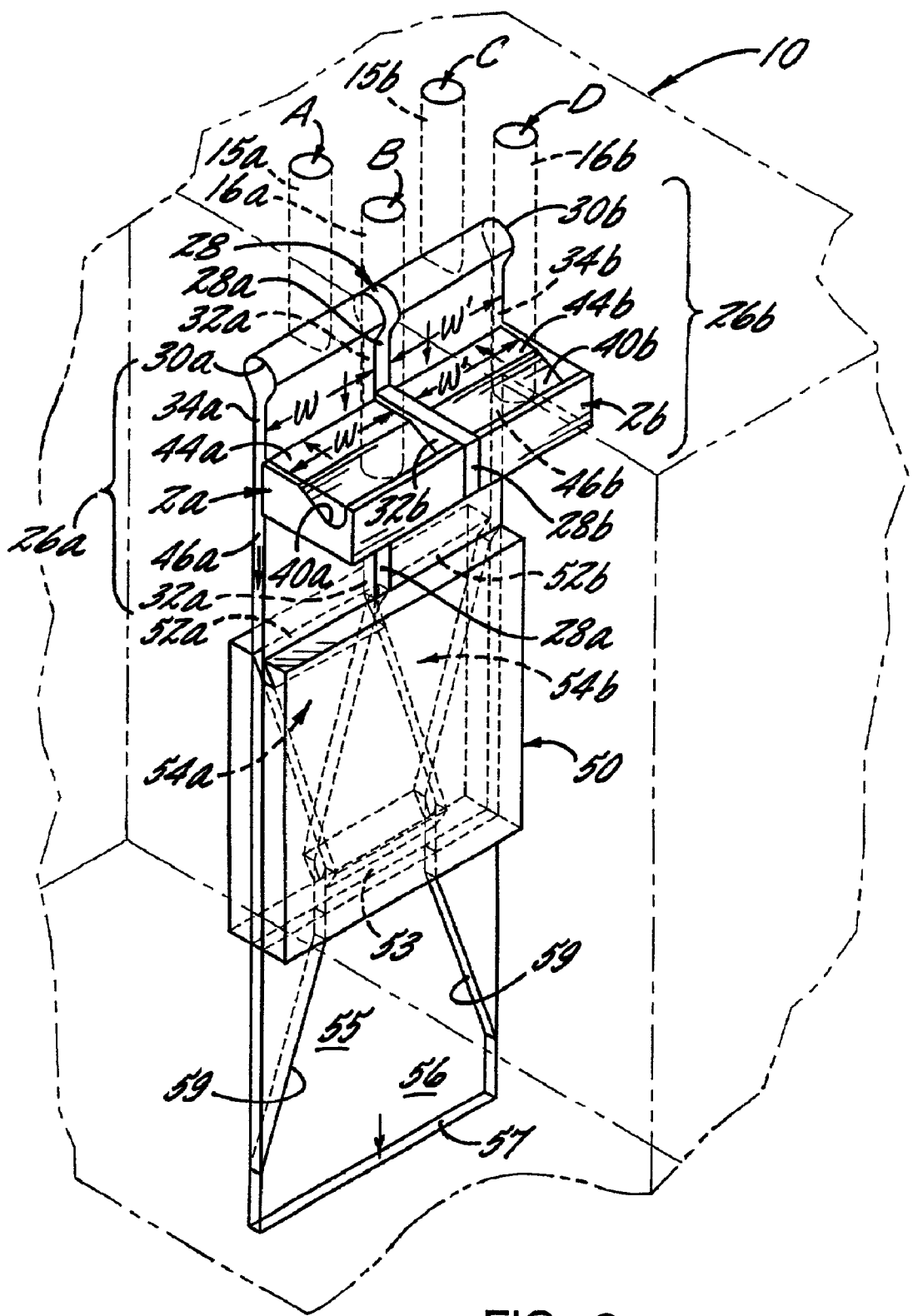
FIG. 2 is a perspective view of a preferred apparatus in accordance with the present invention, with most structure for fluid flow shown in solid line for clarity of view, the apparatus being useful in connection with the method depicted in FIG. 1.

Referring to FIGS. 1 and 2, in accordance with the present invention, a first layered stream 12 including an interface 14 having a width w, is formed from precursor streams A,B. Likewise, a second layered stream 22 including an interface 24 having a width w', is formed from precursor streams C,D. As mentioned, a plurality of additional streams up to that needed for microlayer coextrusion, may be used. Furthermore, if desired, additional layered streams may be formed.

With reference now in particular to FIG. 2, an apparatus 10 includes coextrusion substructures 26a,26b, which form precursor streams into a shape suitable for coextrusion and form geometrically defined, layered streams 12,22. A feed channel 15a conveniently connects between an extruder (not shown) for precursor stream A, and coextrusion substructure 26a. Stream A flows into a manifold 30a and spreads in the manifold in a direction generally transverse to a main direction of stream A flow indicated by an arrow located in a preconvergence channel 34a. From the flow-shaping channel manifold, stream A enters preconvergence channel 34a of the flow-shaping channel.

Similarly, a feed channel 16a conveniently connects between an extruder (not shown) for precursor stream B, and a flow-shaping insert 2a of coextrusion substructure 26a. Stream B, advantageously Theologically diverse in properties from stream A, flows into a manifold 40a and spreads in the manifold in a direction generally transverse to a main direction of stream B flow indicated by an arrow located in a preconvergence channel 44a. From the manifold, stream B enters preconvergence channel 44a of coextrusion substructure 26a.

As stream A and stream B exit from preconvergence channels 34a,44a to merge in a flow convergence channel 46a of coextrusion substructure 26a, the shaped streams each advantageously have a width that respectively corresponds to width w of channel 34a and width w of channel 44a, and upon merging, form melt-laminate 12 (shown in FIG. 1), which includes interface 14 (likewise having width w) between the stream layers.

With continued reference to FIG. 2 in particular, feed channels 15b,16b conveniently connect between extruders (not shown) for precursor streams C and D, and coextrusion substructure 26b. Streams C and D, typically rheologically diverse in properties from one another, respectively enter a manifold 30b, and a manifold 40b of a flow-shaping insert 2b. In the manifolds, streams C,D spread in a direction generally transverse to a main direction of stream flow indicated for each by an arrow located in respective preconvergence channels 34b,44b. From manifolds 30b,40b, streams C,D enter the respective preconvergence channels 34b,44b. Thereafter, streams C,D exit from preconvergence channels 34b,44b to merge in a flow convergence channel 46b of coextrusion substructure 26b, the shaped streams each advantageously having a width that respectively corresponds to width w' of channel 34b and width w' of channel 44b, and upon merging, form melt-laminate 22 (shown in FIG. 1), which includes interface 24 (likewise having width w') between the stream layers.

As may be understood from FIG. 2, manifolds 30a,40a of coextrusion substructure 26a beneficially provide the streams exiting from preconvergence channels 34a,44a with width w, and manifolds 30b,40b of coextrusion substructure 26b beneficially provide the streams exiting from preconvergence channels 34b,44b with width w'. However, as a skilled artisan will appreciate, width w or w' could, for instance, alternatively be provided downstream of a manifold by increasing or decreasing stream width in the respective preconvergence channel. Also, although it is beneficial for width w and width w' to substantially correspond to one another when layered streams 12,22 are formed, a skilled artisan will appreciate that width w may be greater or less than width w' when layered streams 12,22 are formed.

The relative volume of the layers in each of layered streams 12,22 can be controlled by relative volumetric throughput. As described by U.S. Pat. No. 5,389,324 to Lewis, typical techniques for controlling relative volumetric flow rate include the use of temperature differential to affect relative stream viscosities, and the use of flow passage geometry, for instance, the use of substantial differences in length, height and/or width of respective flow paths; and a multilayered structure with a layer thickness gradient can be thereby formed. In accordance with the present invention, a substantial difference in output of respective extruders can also be utilized.

Conveniently, a relatively greater extruder output is used for stream B than for stream A, as a result of which the flow volumes of streams A,B are substantially different as these streams form layered stream 12, which is thus characterized by, as indicated by FIG. 1, relatively greater volume of the B layer than the A layer. If desired, relative volumetric or mass flow rate could be used to effect greater volume or mass of the A layer compared to the B layer in melt-laminate 12, or as indicated for layered stream 22, the layers may be substantially equal in mass.

As also indicated in FIG. 1, geometrically defined streams 12,22 each have a thickness t, which is generally perpendicular to respective interfaces 14,24. Streams 12,22 can be wider than thicker (as shown), square, or thicker than wider. In any event, in accordance with the invention, streams 12,22 are suitably shaped for subsequent melt-lamination. By suitably shaped for melt-lamination or suitably shaped for coextrusion, is meant for purposes of this invention, that the flow streams to be melt-laminated or coextruded include at least one planar surface. Similarly, by "flow-shaping" as used in this description to describe features such as a flow-shaping channel or flow-shaping insert, is meant that the channel or insert produces a flow stream having a least one planar surface.

From the foregoing it can therefore be understood that in accordance with an advantageous embodiment of the present invention, a shaped layered stream including a continuous, generally planar interface having width w, is formed by merging shaped streams likewise having width w, and a shaped layered stream including a continuous, generally planar interface having width w', is formed by merging shaped streams likewise having width w'. Thus, unlike the Schrenk et al prior art, shaped layered streams for producing a shaped layered composite by melt-lamination are formed independently of one another. Accordingly, by the method of the present invention, there is no layered precursor stream common to layered streams 12,22, with the result that layered streams 12,22 are formed free of division of a layered precursor stream and hence are not branch streams. Therefore, layered flow stream manipulation is reduced. Benefits include less interface distortion and less layer deformation and distortion.

Referring again to FIG. 2, coextrusion substructure 26a and coextrusion substructure 26b together constitute a coextrusion structure, which in accordance with the present invention, is partitioned into substructures 26a,26b by a partition member 28. In this regard, an elongated portion 28a of partition member 28 defines manifolds 30a,30b by partitioning, defines preconvergence channels 34a,34b by partitioning, and defines flow convergence channels 46a,46b by partitioning. Furthermore, elongated portion 28a of the partition plate provides a side wall 32a of manifold 30a, preconvergence channel 34a and flow convergence channel 46a, and a side wall (not shown) of manifold 30b, preconvergence channel 34b, and flow convergence channel 46b.

Moreover, the partition member includes an arm 28b, which extends between and is disposed adjacent to shaping inserts 2a,2b. In this way, arm 28b, which is illustrated as being oriented generally perpendicular to elongated portion 28a, separates manifolds 40a,40b, and separates preconvergence channels 44a,44b, of shaping inserts 2a,2b, and provides a side wall 32b of manifold 40a and preconvergence channel 44a, and a side wall (not shown) of manifold 40b and preconvergence channel 44b.

The partition member is beneficially a removable partition plate. Likewise, flow-shaping inserts 2a,2b are beneficially removable from the body of apparatus 10. However, removability is not a necessary feature of a useful partition member or useful flow-shaping structure.

Beneficially, the partition member is generally centrally disposed within the coextrusion structure, with respect to the transverse flow direction. As a result, the partitioning produces coextrusion substructures 26a,26b generally equal to one another in the transverse flow direction, and including for example, manifolds 30a,30b generally equal to one another in the transverse flow direction, and channels 46a, 46b likewise generally equal to one another in the transverse flow direction.

Figure 3:
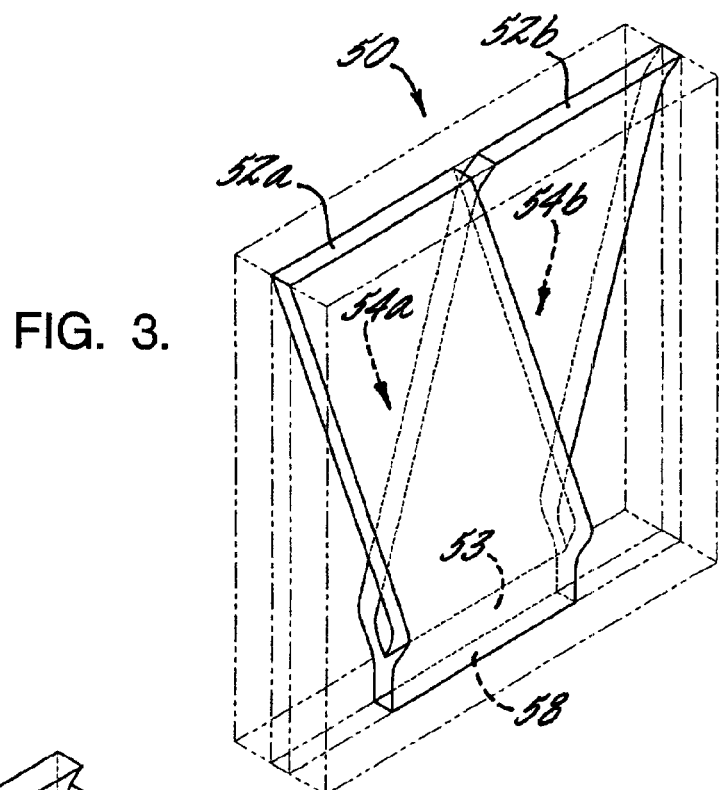
FIG. 3 is a detailed view of the flow sequencer of the apparatus of FIG. 2, with flow cavities shown in solid line for clarity.

With continued reference to FIG. 2 and referring also to FIG. 3, side-by-side channels 46a,46b are in fluid communication with a flow sequencer 50, and more specifically, as shown, with inlets 52a,52b to flow-sequencing channels 54a,54b of flow sequencer 50. Flow-sequencing channels 54a,54b change in relative orientation to one another from a coplanar, side-by-side orientation at inlets 52a,52b to a stacked orientation as they converge to form an interface generating channel 53. As described later, the flow sequencer, like partition plate 28 and inserts 2a,2b, may be beneficially removably inserted in a cavity in the body of apparatus 10.

Referring also to FIG. 1 and to the x-y-z coordinate system depicted, in which x, y and z are oriented generally perpendicular to one another, at inlets 52a,52b of sequencer 50, generally rectangularly shaped, layered streams 12,22 are conveniently disposed side-by-side along the x-axis. Within the flow sequencer, shaped streams 12,22 each flow generally in the main flow or z-direction, with interfaces 14,24 generally in alignment with the x-axis and hence generally perpendicular to the y-axis. In accordance with the invention, the shaped streams, while flowing generally in the z-direction, are oriented and sequenced within sequencer 50 by flow-sequencing channels 54a,54b from the side-by-side orientation along the x-axis to a stacked orientation in which, like branch streams of FIG. 1 of the '788 patent, shaped stream 12 defines a first plane and shaped stream 22 defines a second plane along the y-axis. As noted, the main flow direction defines the z-direction; thus, the z-direction, as well as the x-axis and y-axis, changes with change in the main flow direction. Although reorienting of both of streams 12,22 along the x-axis and y-axis is shown, a skilled artisan will recognize that reorienting of only one stream along the x-axis and y-axis may be sufficient.

With continued reference to FIGS. 1 to 3, in interface generating channel 53 of sequencer 50, reoriented streams 12,22, suitably shaped for melt-lamination, are combined along major surfaces thereof defined by an x-z plane of the x-y-z coordinate system, to generate a continuous, generally planar interface boundary 64 in a shaped layered composite 62 consisting of shaped layers stacked in the y-direction. It can thus be understood that because unlike the Shrenck et al prior art, there is no layered precursor stream common to layered streams 12,22, shaped layered composite 62 is formed independent of division of a layered precursor stream.

As indicated in FIG. 1, stream 22 conveniently contributes a relatively greater proportion of the volume or mass of shaped layered composite 62, than stream 12 contributes. As before, the relative volume or mass can be controlled by relative volumetric or mass throughput. Conveniently, relatively greater extruder output is used for streams C,D than for streams A,B, as a result of which the flow volumes of layered streams 12,22 are substantially different as shaped layered composite 62 is formed by melt-lamination in interface generating channel 53. If desired, relative volumetric or mass flow rates could be used to effect relatively greater volume or mass of shaped stream 12 than shaped stream 22 in shaped layered composite 62, or the reverse, or the contribution to composite 62 could be substantially equal. Conveniently, shaped streams 12,22 substantially correspond to one another in width, and edges of stream 12 are aligned with edges of stream 22, when forming interface 64.

Thereafter, referring again to FIG. 2, shaped layered composite 62 is passed from the flow sequencer through a dimension-altering channel 55 that leads to a connecting channel 56 that terminates in an exit slot 57 of apparatus 10. More precisely, referring also to FIG. 3, interface generating channel 53 leads to an exit slot 58 of the flow sequencer, and thereafter in channel 55, which includes opposing walls 59 disposed relative to one another for conveniently increasing the stream width, shaped layered composite 62 is increased in width prior to exit from apparatus 10. The relatively increased width of composite 62 will reduce the width ratio of composite 62 to a downstream die.

Thereafter in accordance with the invention, shaped layered composite 62 is passed from apparatus 10 directly or indirectly into an appropriate conventional downstream extrusion die, from which a multilayered sheet product 69 illustrated in FIG. 1, exits. If desired, composite 62 could be converged with one or more like streams that have been similarly formed, prior to entry into the downstream extrusion die. With continued reference to FIG. 1, sheet 69 has a width W greater than a thickness T, the sheet width typically being increased by processing in the extrusion die; and interface 64 generated in flow sequencer 50 is generally parallel to the sheet width W. Relative to a useful extrusion die, attention is drawn to FIG. 1 of U.S. Pat. No. 4,426,344 to Dinter et al, which generally depicts a downstream extrusion die, and this aspect of Dinter et al is hereby incorporated by reference into this description. However, unlike the product shown in FIG. 2 of Dinter et al, in which the newly formed interface and the prior formed interfaces are generally perpendicular to one another, interface 64 generated after stream reorientation, is generally parallel to prior formed interfaces 14,24.

Thus, in accordance with the invention, a multilayered composite product including layers of reduced deformation or distortion and hence of improved performance, is obtainable by the present invention. In addition, because the subject invention does not require use of branch streams, composite products of more varied layer composition, are obtainable. For example, the four layers of sheet product 69 may be diverse in properties from one another and hence represented as A/B/C/D, whereas with the Schrenk et al prior art, an interdigitated structure with a layer composition of A/B/A/B would result. Furthermore, as illustrated by the embodiment of apparatus 310, interface generation does not require at a minimum, doubling the total number of layers. Moreover, when the present invention is applied to microlayer coextrusion, improved results are obtainable.

Arrows located in flow convergence channel 46a and connecting channel 56 indicate a main direction of fluid flow from formation of streams 12,22 to exit of shaped layered composite 62 from apparatus 10. Side plates (not shown) enclose coextrusion structure 26 and the remaining otherwise exposed structure of apparatus 10, including flow sequencer 50 and downstream channel 56.

Generally speaking, consistent with avoiding division of a layered precursor stream (division being taught by the Shrenck et al prior art), it is preferred that any dimensional or shape modification of a shaped layered stream be minimized. However, a skilled artisan will recognize that the dimensions of shaped layered streams may be modified as appropriate to meet specific process or product requirements. Thus, dimensional manipulation of one or both of shaped layered streams 12,22 may be effected prior to forming interface 64. In addition, the shape of shaped layered composite 62 can be modified to meet specific process or product requirements. Generally, change in thickness and/or width will be carried out, as previously indicated, after exit of a shaped layered stream from apparatus 10. Thus, depending upon requirements, manipulation of shaped layered streams by change in flow channel geometry, may be minimized.

Figure 4:
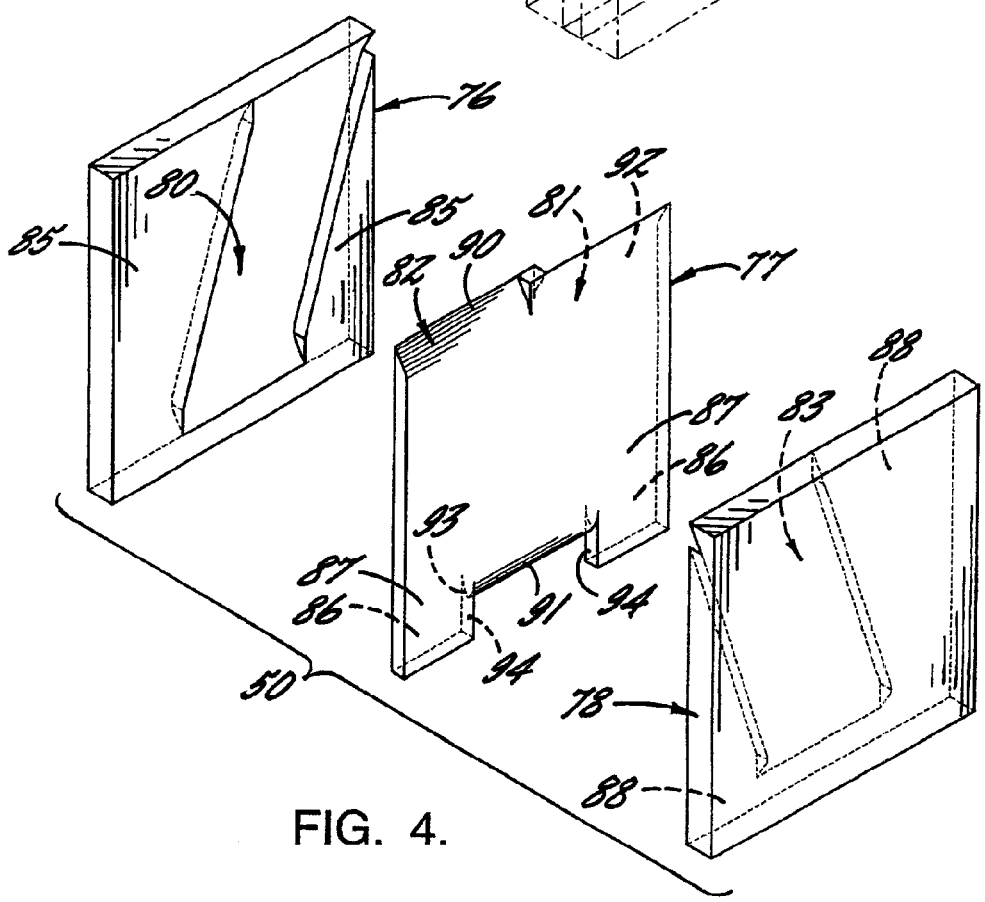
FIG. 4 is an exploded view showing components of the flow sequencer of FIG. 3.

Referring to FIGS. 3 and 4, flow sequencer 50 beneficially is an assembly of a plurality of plates 76,77,78 with surface channels 80,81,82,83, as shown and indicated in plate faces 85,86,87,88, respectively, which combine to form flow-sequencing channels 54a,54b, and inlets 52a,52b of channels 54a,54b. Thus, inlet 52a and channel 54a are provided by surface channel 82, which includes an inlet channel portion 90 and a flow convergence-promoting channel portion 91, in face 87 of plate 77, and by opposing surface channel 83 in opposing face 88 of plate 78. Likewise, inlet 52b and channel 54b are provided by surface channel 80 in face 85 of plate 76, and by opposing surface channel 81, which includes an inlet channel portion 92 and a flow convergence-promoting channel (or exit channel) portion 93, in opposing face 86 of plate 77.

With continued reference to FIGS. 3 and 4, interface generating channel 53 and exit slot 58 of the flow sequencer are formed in part by opposing side walls 94 (indicated in FIG. 4) of plate 77. Alignment pins and corresponding bores (not shown) advantageously provide for alignment of plates 76,77,78 and of the surface channels with one another.

Figure 5:
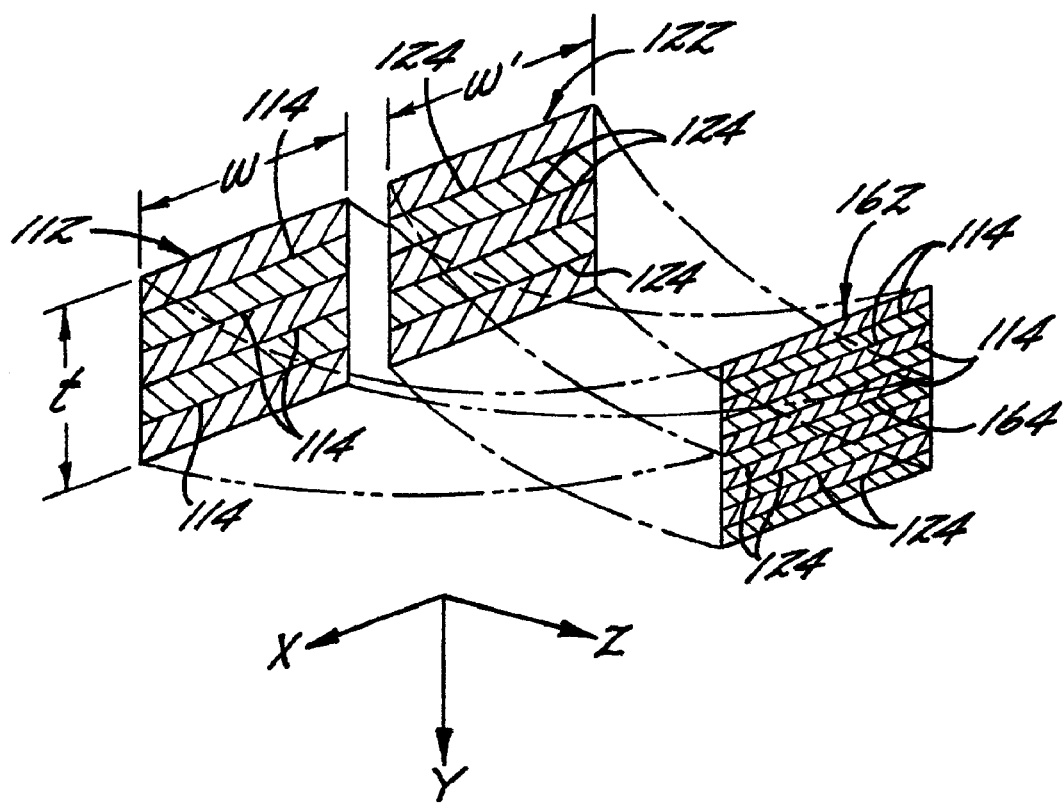
FIGS. 5, 6 and 7 pertain to a second preferred embodiment of the present invention.

Referring to FIG. 5, in accordance with the present invention, a first five-layered melt-laminate 112 including interfaces 114 having a width w, is formed from precursor streams. Likewise, a second five-layered melt-laminate 122 including interfaces 124 having a width w", is formed from precursor streams.

Figure 6:
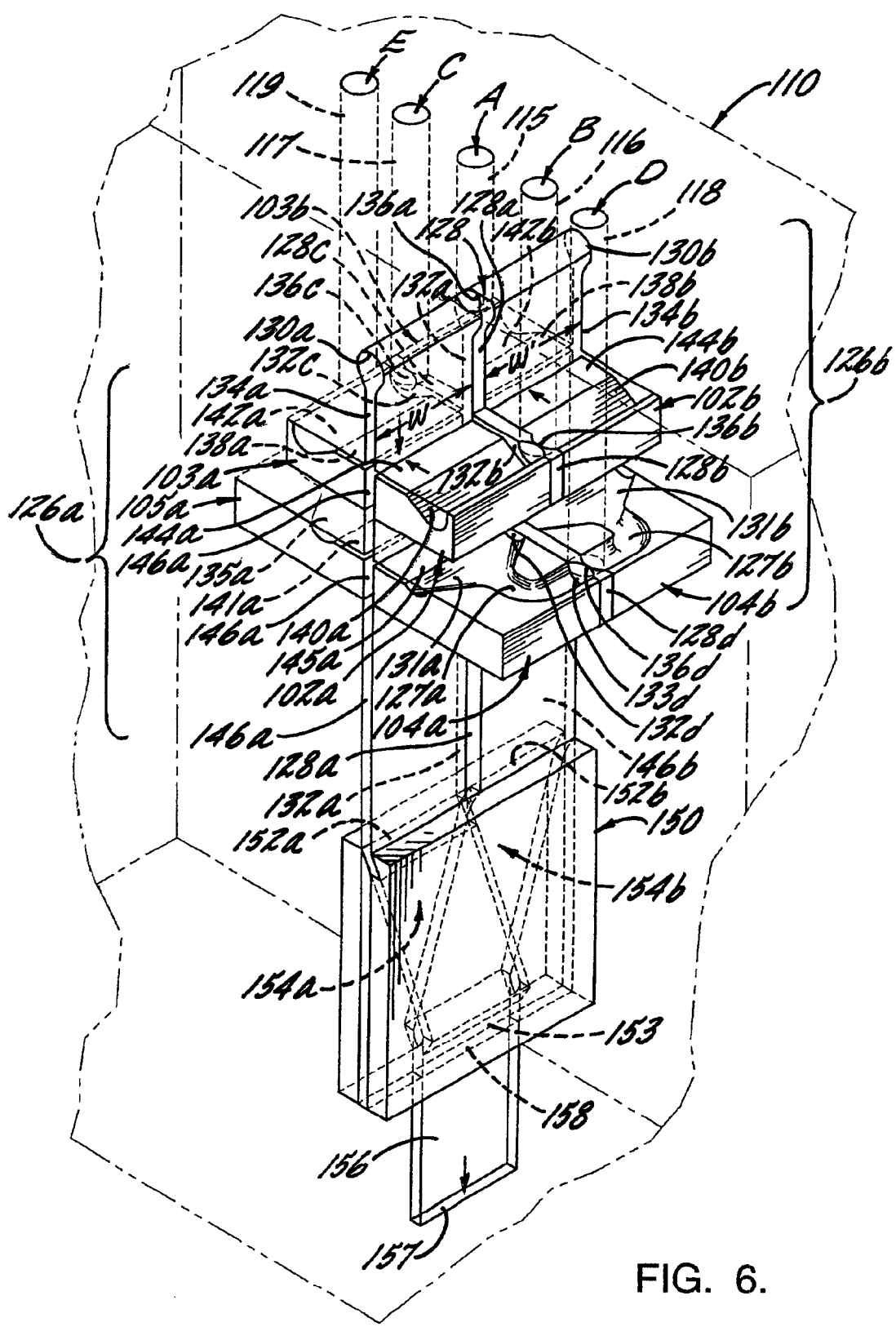

With reference to FIG. 6, an apparatus 110 is shown that differs from apparatus 10 of FIG. 2 primarily in that a coextrusion substructure 126a, and a coextrusion substructure 126b together constitute a coextrusion structure for forming 5-layer melt-laminates 112,122, and to this end, include three additional sets of shaping inserts (of these, only shaping inserts 103a,103b, 104a,104b,105a shown), and in that a partition member 128 divides precursor streams as the streams enter the coextrusion structure. These inserts, like shaping inserts 102a,102b and a flow sequencer 150, are beneficially removable from apparatus 110. As before, the partition member beneficially is generally centrally disposed within the coextrusion structure, with respect to the transverse flow direction.

In FIG. 6, most features of shaping inserts 103a,103b, 105a are depicted in dashed line to emphasize that these inserts, like the other shaping inserts, are disposed within cavities in the body of apparatus 110. Previously in connection with FIG. 2, certain of the foregoing features and other aspects have been described. Therefore, like parts have been designated with like numbers, the description of apparatus 110 is abbreviated, and reference can be made to the earlier description relative to apparatus 10.

Feed channels 115,116,117,118,119 conveniently connect between extruders (not shown) and the coextrusion structure of apparatus 110, whereby precursor streams A, B, C, D and E respectively enter the coextrusion structure, as shown. The precursor streams may beneficially be Theologically diverse from each another; however, in any event, streams B and C are beneficially diverse from stream A, and streams D and E are beneficially diverse from streams B and C, respectively.

Figure 7:
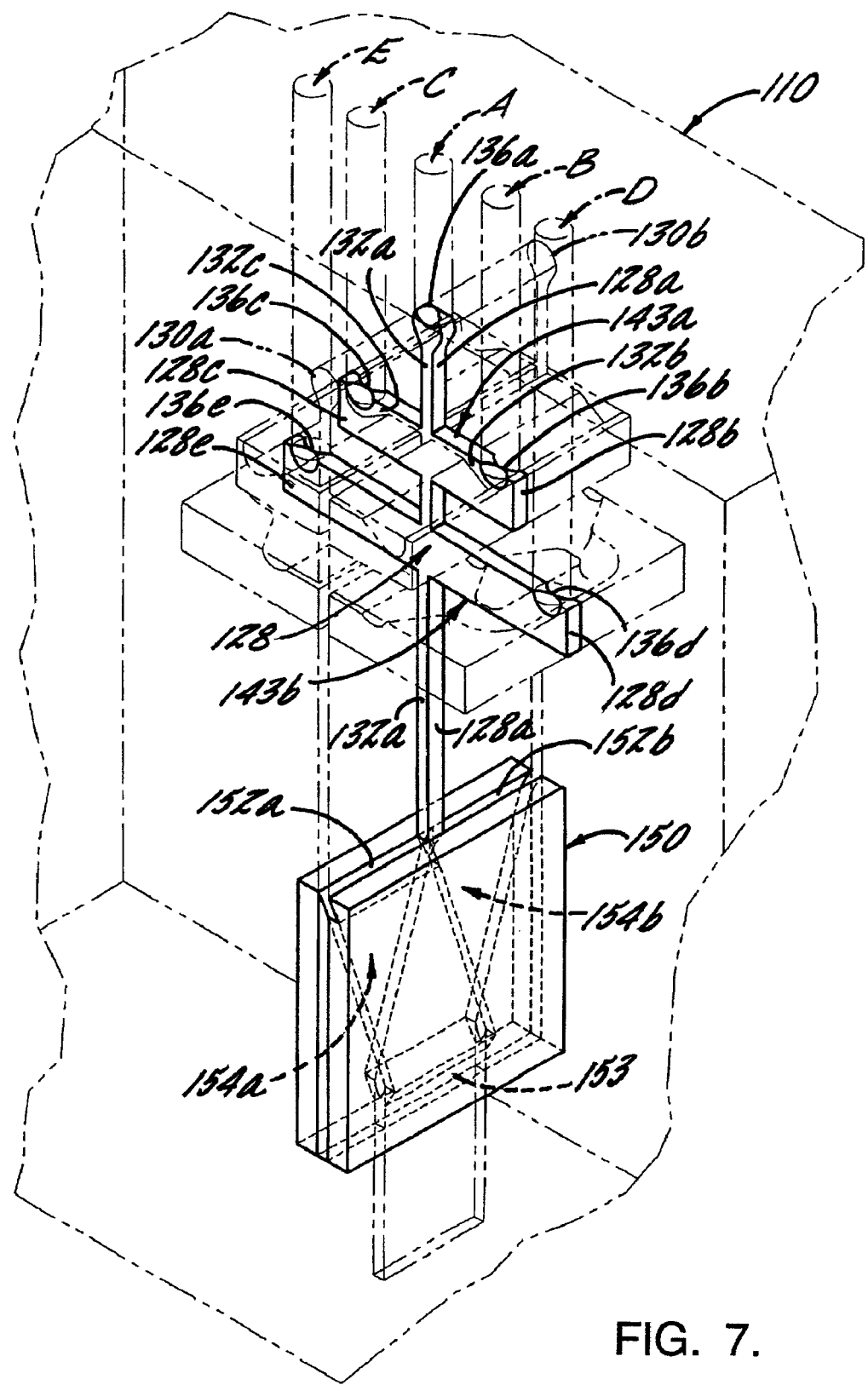

As precursor stream A flows from feed channel 115 into the coextrusion structure, stream A is divided by a dividing wall 136a of an elongated portion 128a of partition member 128. Referring also to FIG. 7, generally T-shaped, partition member 128 and elongated portion 128a are more clearly shown. Thereafter, stream A, now divided, spreads in manifolds 130a,130b in a direction generally transverse to a main direction of stream A flow indicated by an arrow located in a preconvergence channel 134a, and enters preconvergence channels 134a,134b.

With continued reference to FIGS. 6 and 7, as precursor stream B flows from feed channel 116 into the coextrusion structure, stream B is divided by a dividing wall 136b of an arm 128b of a first crossbar 143a of the partition member. Thereafter, stream B, now divided, spreads in manifolds 140a,140b of shaping inserts 102a,102b in a direction generally transverse to a main direction of stream B flow indicated by arrows located in preconvergence channels 144a,144b, and enters preconvergence channels 144a,144b.

Arm 128b extends between and is disposed adjacent to shaping inserts 102a,102b. In this way, arm 128b separates manifolds 140a,140b, and separates preconvergence channels 144a,144b, of the shaping inserts, and furthermore provides a side wall 132b of manifold 140a and preconvergence channel 144a, and a side wall (not shown) of manifold 140b and preconvergence channel 144b. The side walls of manifolds 140a,140b converge to provide dividing wall 136b.

Likewise, as precursor stream C flows from feed channel 117 into the coextrusion structure, stream C is divided by a dividing wall 136c of an opposite arm 128c of crossbar 143a of the partition member. Thereafter, stream C, now divided, spreads in manifolds 142a,142b of shaping inserts 103a, 103b in a direction generally transverse to the direction of flow indicated by the arrows located in preconvergence channels 144a,144b, and enters preconvergence channels 138a,138b.

Arm 128c extends between and is disposed adjacent to shaping inserts 103a,103b. In this way, arm 128c separates manifolds 142a,142b, and separates preconvergence channels 138a,138b, of the shaping inserts, and furthermore provides a side wall 132c of manifold 142a and preconvergence channel 138a, and a side wall (not shown) of manifold 142b and preconvergence channel 138b. The side walls of manifolds 142a,142b converge to provide dividing wall 136c.

Similarly, precursor streams D and E enter the coextrusion structure of apparatus 110 through feed channels 118,119, which communicate with the respective manifolds of the respective flow-shaping inserts via inlet channels. Only shaping inserts 104a,104b,105a, inlet channels 127a,127b, and manifolds 131a,131b,135a are shown in FIG. 6; a shaping insert, inlet channel and manifold like that shown relative to shaping insert 104b are not shown.

Referring again to both FIGS. 6 and 7, as precursor stream D flows from feed channel 118 into the coextrusion structure, stream D is divided by a dividing wall 136d of an arm 128d of a second crossbar 143b of the partition member. Thereafter, stream D, now divided, passes through inlet channels 127a,127b and spreads in manifolds 131a,131b of shaping inserts 104a,104b, in a direction generally transverse to the direction of flow indicated by the arrows located in preconvergence channels 144a,144b, and then enters the respective preconvergence channels (only part of preconvergence channel 145a shown).

Arm 128d extends between and is disposed adjacent to the shaping inserts. As a result, arm 128d separates inlet channels 127a,127b, separates manifolds 131a,131b, and separates the preconvergence channels, of the shaping inserts. Furthermore, arm 128d provides a side wall 133d of inlet channel 127a, a side wall 132d of manifold 131a and preconvergence channel 145a, a side wall (not shown) of inlet channel 127b, and a side wall (not shown) of manifold 131b and its preconvergence channel (not shown). The side walls of the inlet channels converge to provide dividing wall 136d. Like the first crossbar, crossbar 143b is illustrated as being oriented generally perpendicular to elongated portion 128a of the partition member.

Likewise, precursor stream E flows from feed channel 119 to the respective shaping inserts (only part of insert 105a shown) of the coextrusion structure, is divided by a dividing wall 136e of an opposite arm 128e of the partition member. Thereafter, stream E, now divided, passes through the respective inlet channels, and thereafter spreads in the respective manifolds (only part of manifold 135a shown) in a direction generally transverse to the direction of flow indicated by the arrows located in preconvergence channels 144a,144b, and enters the respective preconvergence channels (only part of preconvergence channel 141a shown).

As streams A, B and C, now divided, exit from preconvergence channels 134a,144a,138a of coextrusion substructure 126a to merge in a flow convergence channel 146a, the shaped streams each advantageously have a width that corresponds to width w of channel 134a, and upon merging, form a shaped 3-layer melt-laminate that includes layer interfaces corresponding in width to width w. Downstream thereof, as streams D and E, now divided, exit from preconvergence channels 145a,141a of coextrusion substructure 126a to merge in common channel 146a with the earlier formed 3-layer melt-laminate, shaped streams D,E each also have a width that corresponds to width w of channel 134a, and upon merging, form a 5-layer melt-laminate 112 (shown in FIG. 5), which includes interfaces 114 likewise having width w.

Similarly, as streams A, B and C, now divided, exit from preconvergence channels 134b,144b,138b of coextrusion substructure 126b to merge in a flow convergence channel 146b, the shaped streams each advantageously have a width that corresponds to width w' of channel 134b, and upon merging, form a shaped 3-layer melt-laminate that includes interfaces corresponding in width to width w'. Downstream thereof, as streams D and E, now divided, exit from the respective preconvergence channels (not shown) of coextrusion substructure 126b to merge in common channel 146b with the earlier formed 3-layer melt-laminate that includes interfaces corresponding in width to width w', shaped streams D,E each also have a width that corresponds to width w' of channel 134b, and upon merging, form a 5-layer melt-laminate 122 (shown in FIG. 5), which includes interfaces 124 likewise having width w'.

As may be understood from FIG. 6, the manifolds of coextrusion substructure 126a beneficially provide the streams exiting from the preconvergence channels of coextrusion substructure 126a with width w. Similarly, the manifolds of coextrusion substructure 126b beneficially provide the streams exiting from the respective preconvergence channels with width w'. However, width w or w' could, for instance, alternatively be provided downstream of a manifold by increasing or decreasing stream width in the respective preconvergence channel.

Referring again to FIG. 5, geometrically defined, 5-layer streams 112,122 each have a thickness t, which is generally perpendicular to respective interfaces 114,124. As desired, shaped streams 112,122 could be wider than thicker (as shown), square, or thicker than wider. If desired, the relative volume or mass of the layers in streams 112,122 can be varied by varying the relative volumetric or mass flow rates. In any event, in accordance with the invention, streams 112,122 are suitably shaped for subsequent melt-lamination.

Accordingly, in accordance with an advantageous embodiment of the present invention, shaped, 5-layer stream 112 including continuous, generally planar interfaces 114 having width w, is formed by merging shaped streams likewise having width w, and shaped, 5-layer stream 122 including continuous, generally planar interfaces 124 having width w', is formed by merging shaped streams likewise having width w'. Because precursor streams are divided in this embodiment, streams 112,122 have identical layer sequencing. If desired, modification of apparatus 110 to be like the embodiment shown in FIG. 2 in regard to precursor stream input, would allow streams 112,122 to differ from one another in layer sequencing, and in such case, the streams merged to form layered stream 112 could be of the same composition as, or differ in composition from, the streams merged to form layered stream 122. Also in such case, differences in extruder output could be used to vary the relative volume or mass of the shaped, 5-layer streams in the shaped, 10-layer composite subsequently formed.

Referring both to FIG. 5 and the x-y-z coordinate system depicted and to FIG. 6, at inlets 152a,152b of flow sequencer 150, layered streams 112,122, suitably shaped for melt-lamination, are conveniently disposed side-by-side along the x-axis. Within the flow sequencer, the shaped streams each flow generally in the main flow or z-direction, with interfaces 114,124 generally aligned with the x-axis. In accordance with the invention, the shaped streams are reoriented in flow sequencer 150 as previously described with reference to streams 12,22 to a stacked orientation in which the shaped streams define different planes spaced apart along the y-axis, and melt-laminated to generate a continuous, generally planar interface boundary 164 in a shaped, 10-layer composite 162 consisting of shaped layers stacked in the y-direction. Thereafter, shaped layered composite 162 is conveniently passed, without change in width or thickness, from the flow sequencer through a connecting channel 156 that terminates in an exit slot 157 of apparatus 110. An arrow located in connecting channel 156 indicates a main direction of fluid flow from formation of streams 112,122 to exit of shaped layered composite 162 from apparatus 110.

As indicated in FIG. 5, shaped streams 112,122 contribute substantially equally to the volume of shaped layered composite 162. However, removability of the shaping inserts advantageously allows relative flow rates to be modified, by for instance, using one or more substitute shaping inserts each having a longer or shorter path length for the preconvergence channel. Thus, for example, shaping inserts 102a, 103a,104a,105a can be exchanged for shaping inserts each having a relatively shorter preconvergence channel path length, and as a result, shaped stream 112 would contribute a relatively greater volume than shaped stream 122 to the volume or mass of shaped layered composite 162. This advantage likewise may be used to control the relative flow volumes of streams A, B, C, D, and E in either or both of layered streams 112,122, whereby, if desired, either or both layered streams can be produced with layer thickness differences, and even with a layer thickness gradient.

In accordance with the invention and as described relative to the embodiment of FIGS. 1 and 2, shaped layered composite 162 is passed from apparatus 110 directly or indirectly into an appropriate conventional downstream extrusion die, from which a multilayer sheet product exits. Like sheet product 69, this multilayer sheet product has a width greater than its thickness, and the interface generated subsequent to stream reorientation is generally parallel to the sheet width.

Figure 8:
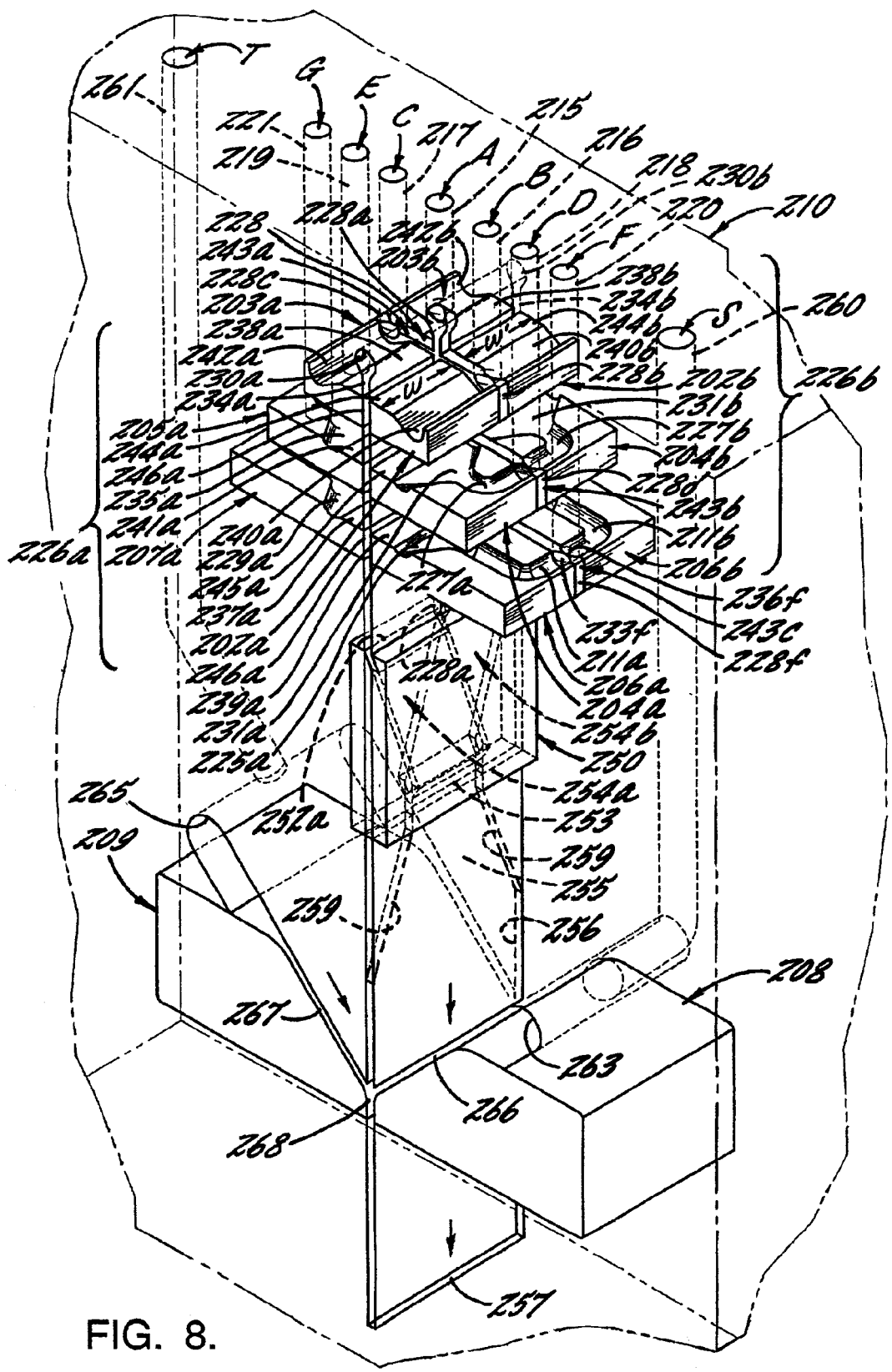
FIG. 8 is a perspective view of another preferred embodiment.

With reference to FIG. 8, an apparatus 210 is shown that differs from apparatus 110 of FIG. 6 primarily in that a coextrusion substructure 226a, and a coextrusion substructure 226b together constitute a coextrusion structure for forming 7-layer streams, and to this end, include two additional sets of shaping inserts, in that a partition member 228 includes a third crossbar 243c, and in that apparatus 210 further includes skin layer-forming inserts 208,209. These inserts like the other inserts and a flow sequencer 250, are advantageously removably inserted in cavities in the body of apparatus 210. In the Figure, these inserts and flow sequencer 250 are depicted in solid line for clarity of view of these features, whereas flow cavities of apparatus 210 are either omitted or shown in dashed line. As before, partition member 228 beneficially is generally centrally disposed within the coextrusion structure, with respect to the transverse flow direction, so that coextrusion substructures 226a, 226b are generally equal to one another in the transverse flow direction.

Previously in connection with apparatus 10 and 110, certain of these and other aspects have been described. Therefore, like parts have been designated with like numbers, the description of apparatus 210 is abbreviated, and reference can be made to the prior descriptions relative to apparatus 10 and 110.

Feed channels 215,216,217,218,219,220,221 conveniently connect between extruders (not shown) and the coextrusion structure of apparatus 210, whereby precursor streams A, B, C, D, E, F and G respectively enter the coextrusion structure, as shown. The precursor streams may beneficially be diverse in Theological properties from each another; however, in any event, streams B and C are beneficially diverse from stream A, streams D and E are beneficially diverse from streams B and C, respectively, and streams F and G are beneficially diverse from streams D and E, respectively.

Similar to apparatus 110, a 5-layer, geometrically defined melt-laminate having a width corresponding to a width w of a channel 244a is made in a flow convergence channel 246a from shaped streams exiting the appropriate preconvergence channels of coextrusion substructure 226a and having a width that corresponds to width w; and a 5-layer, geometrically defined melt-laminate having a width corresponding to a width w' of channel 244b is made in a flow convergence channel (not shown) from shaped streams exiting the appropriate preconvergence channels of coextrusion substructure 226b and having a width that corresponds to width w'. However, additional layers are added as hereinafter described.

Precursor streams F and G enter the coextrusion structure of apparatus 210 through feed channels 220,221, which communicate with the respective manifolds of the respective flow-shaping inserts via inlet channels 211. Only flow-shaping inserts 206a,206b,207a, inlet channels 211a,211b, and manifolds 225a,229a are shown in full or part. An inlet channel (not shown) like inlet channel 211a, leads to manifold 229a of insert 207a; inlet channel 211b leads to a manifold (not shown) like manifold 225a; and an inlet channel (not shown) like inlet channel 211a, leads to a manifold (not shown) like manifold 225a of an insert (not shown).

As precursor stream F flows from feed channel 220 into the coextrusion structure, stream F is divided by a dividing wall 236f of an arm 228f of a third crossbar 243c of partition member 228. Thereafter, stream F, now divided, passes through inlet channels 211a,211b and spreads transversely in the respective manifolds (only part of manifold 225a shown) of shaping inserts 206a,206b, and enters the respective preconvergence channels (only part of preconvergence channel 239a shown).

Arm 228f extends between and is disposed adjacent to shaping inserts 206a,206b. In this way, arm 228f separates inlet channels 211a,211b, separates the manifolds, and separates the preconvergence channels, of the shaping inserts. Furthermore, arm 228f provides a side wall 233f of inlet channel 211a and a side wall (not shown) of inlet channel 211b. The side walls of the inlet channels converge to provide dividing wall 236f.

Likewise, precursor stream G is divided by the respective dividing portion of the opposite arm (not shown) of crossbar 243c of the partition member. Thereafter, stream G, now divided, passes through the respective inlet channels and spreads transversely in the respective manifolds (only part of manifold 229a shown) of the respective shaping inserts (only part of shaping insert 207a shown), and enters the respective preconvergence channels (only part of preconvergence channel 237a shown).

As streams F and G, now divided, exit from preconvergence channels 239a,237a of coextrusion substructure 226a to merge in common channel 246a with the earlier formed 5-layer melt-laminate, shaped streams F,G each have a width that corresponds to width w of preconvergence channel 244a, and upon merging, form a 7-layer melt-laminate that includes interfaces likewise corresponding in width to width w. As streams F and G, now divided, exit from the corresponding preconvergence channels of coextrusion substructure 226b to merge in the respective common channel with the earlier formed 5-layer melt-laminate that corresponds in width to width w' of preconvergence channel 244b, shaped streams F,G each have a width that corresponds to width w' of channel 244b, and upon merging, form a 7-layer melt-laminate that includes interfaces likewise corresponding in width to width w'.

Accordingly, in accordance with an advantageous embodiment of the present invention, a 7-layer, geometrically defined melt-laminate including continuous, generally planar interfaces having width w, is formed by merging shaped streams likewise having width w, and a 7-layer, geometrically defined melt-laminate including continuous, generally planar interfaces having width w', is formed by merging shaped streams likewise having width w'. Because precursor streams are divided in this embodiment, the 7-layer melt-laminates have identical layer sequencing. If desired, modification of apparatus 210 to be like the embodiment shown in FIG. 2 in regard to precursor stream input, would allow the 7-layer melt-laminates to differ from one another in layer sequencing; and in such case, the streams merged to form one of the 7-layer melt-laminates could be of the same composition as, or differ in composition from, the streams merged to form the other 7-layer melt-laminate. Also in such case, difference in extruder output could be used to vary the relative volume or mass of the 7-layer melt-laminates in the 14-layer shaped layered composite subsequently formed. If desired, the relative volume or mass of the layers in the 7-layer melt-laminates can be varied by varying relative volumetric or mass flow rate.

With continued reference to FIG. 8 and by analogy to FIG. 1, at the inlets of flow sequencer 250 (only inlet 250a shown), the two generally rectangularly shaped, 7-layer streams are conveniently disposed side-by-side along the x-axis. Within sequencer 250, the 7-layer streams each flow generally in the z-direction, with the interfaces generally parallel to the x-axis, and in accordance with the invention, are reoriented as previously described with reference to streams 12,22, and melt-laminated to generate a continuous, generally planar interface boundary in a shaped, 14-layer composite consisting of shaped layers stacked in the y-direction. Thereafter, the width of the shaped layered composite is increased as in the case of apparatus 10, in a dimensional-altering channel 255.

Feed channels 260,261 conveniently connect between extruders (not shown) and manifolds 263,265 of apparatus 210 whereby precursor streams S and T respectively enter apparatus 210, as shown, to add skin layers to the shaped, 14-layer composite exiting from connecting channel 256. The skin layers will typically be selected to benefit process and/or product functionality. In the respective manifolds, streams S and T spread in a direction generally transverse to a main direction of flow in the respective downstream preconvergence channels 266,267. The main direction of flow in preconvergence channel 267 is indicated by an arrow. From the manifolds, streams S and T enter respective preconvergence channels 266,267. As the fourteen layer composite passes from connecting channel 256 and shaped streams S and T pass from preconvergence channels 266,267 to merge in a combining channel 268, the shaped streams conveniently correspond in width to the composite, and upon merging, form a shaped, 16-layer composite of like width.

Thereafter in accordance with the invention, the resulting composite exits from apparatus 210 through an exit slot 257, and, as in previous embodiments, is passed directly or indirectly into an appropriate conventional downstream extrusion die, from which a multilayer sheet product exits. Like sheet product 69, this sheet product has a width greater than its thickness, and the interface generated in the flow sequencer is generally parallel to the sheet width. Arrows located in connecting channel 256 and combining channel 268 indicate a main direction of flow from formation of the first layered stream to exit of the 16-layer composite from apparatus 210.

Figure 9:
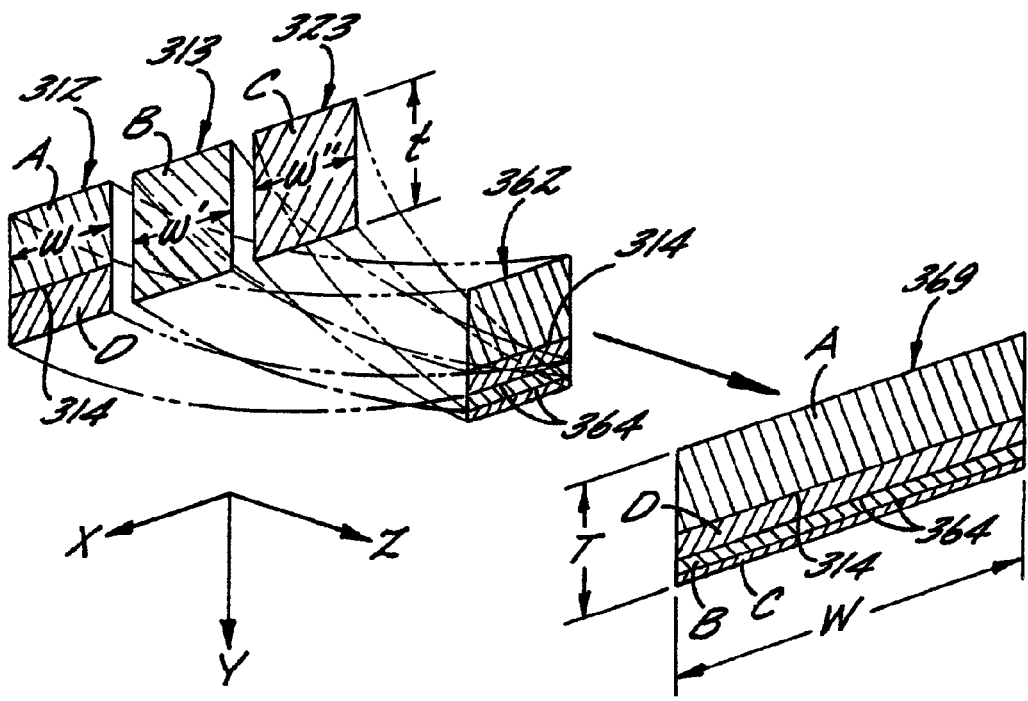
FIGS. 9 and 10 pertain to yet another preferred embodiment.

With reference to FIG. 9, a shaped melt-laminated stream 312 having a generally square or rectangular cross-section and including an interface 314 having a dimension w, is formed from precursor streams. Also formed are shaped streams 313,323 having dimensions w', w", respectively. Conveniently, these dimensions are hereafter referred to as widths. Also shown in FIG. 9 is that the shaped streams each have a dimension t, which conveniently may be referred to as thickness.

Figure 10:
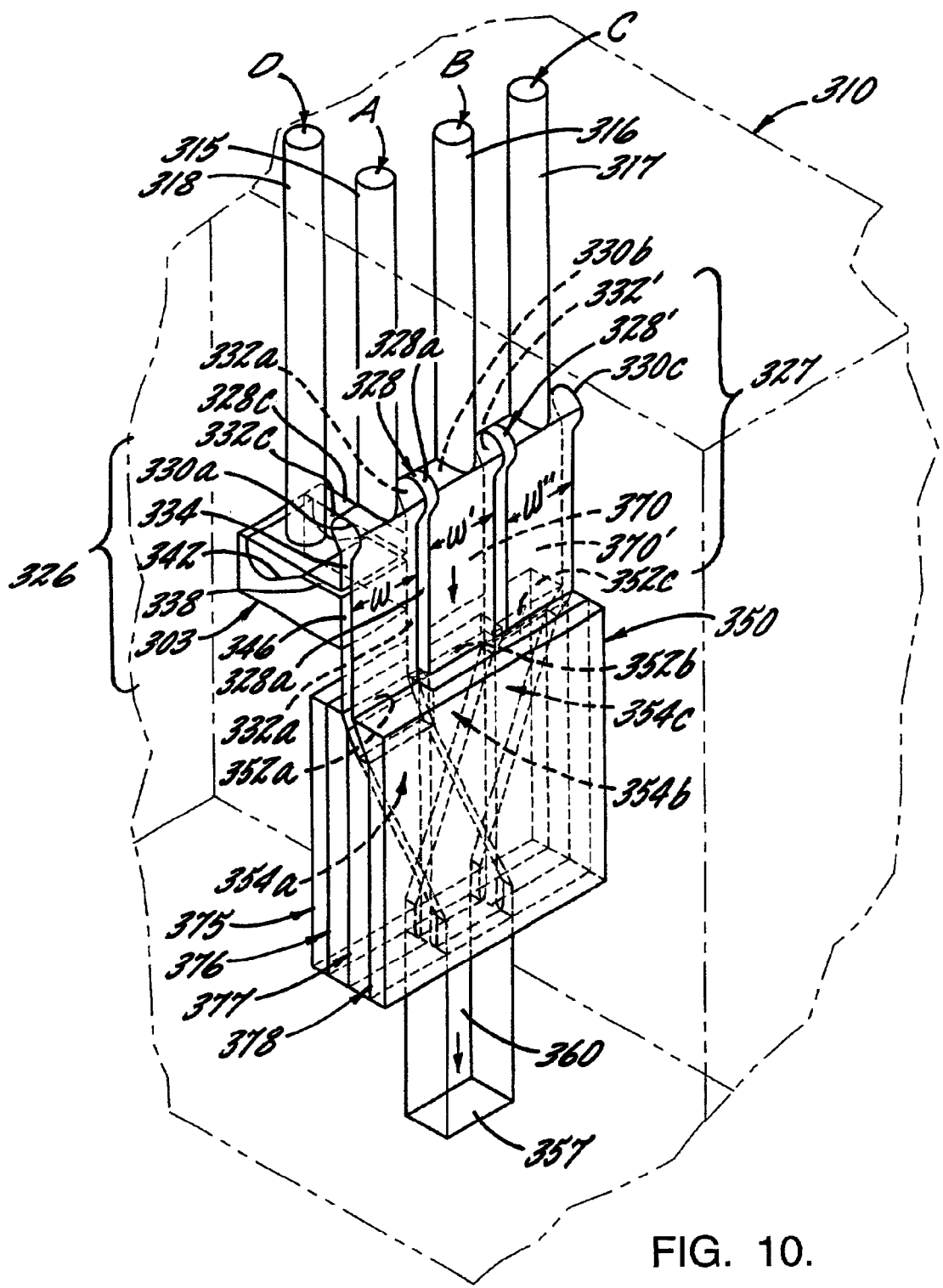

With reference to FIG. 10, an apparatus 310 is shown that differs from apparatus 10 of FIG. 2 in significant respects, including a second partition member 328', a flow sequencer 350 that includes three flow-sequencing channels 354a, 354b,354c, and an interface generating channel 360 located downstream of flow sequencer 350 and in which oriented, sequenced streams are combined. Furthermore, apparatus 310 lacks a second flow-shaping insert.

Similar to apparatus 10, a partition member 328 includes an elongated portion 328a, and an arm 328c illustrated as being oriented generally perpendicular to the elongated portion. Partition member 328' lacks an arm, but is advantageously disposed generally parallel to the elongated portion of partition member 328. Beneficially, partition member 328' and the elongated portion of partition member 328 are generally spaced apart and disposed with respect to the transverse flow direction, so that a flow-shaping structure 327 of apparatus 310 is partitioned into three generally equal portions in the transverse flow direction. In this way, streams leaving preconvergence channel 334 and connecting channels 370,370' of flow shaping structure 327 may be of substantially the same width, and the streams entering flow sequencer 350 likewise may substantially correspond in width to one another.

Inlets 352a,352b,352c of flow-sequencer 350 receive flow from a flow convergence channel 346, and from connecting channels 370,370', through which shaped monolayer streams 313,323 pass. Thus, sequencer 350 orients and sequences a shaped melt-laminated stream and a pair of shaped monolayer streams in preparation for forming a shaped layered composite in channel 360.

Previously in connection with FIG. 2, certain of these and other aspects have been described. Therefore, like parts have been designated with like numbers, the description of apparatus 310 is abbreviated, and reference can be made to portions of the prior description relative to apparatus 10. Apparatus 310 can be modified to include additional flow-shaping inserts, and consistent therewith, partition members 328,328' can be appropriately modified by the addition of one or more crossbars or arms.

Shaping structure 327 forms shaped streams having widths w,w',w". Feed channels 315,316,317,318 conveniently connect between extruders (not shown) and shaping structure 327 and a flow-shaping insert 303. Precursor streams A, B, C and D enter shaping structure 327 and insert 303 through these feed channels. Insert 303 beneficially forms a shaped stream having a width corresponding to width w. Typically, the precursor streams will differ from one another so that diverse streams are adjacent to one another in the product.

Stream A flows from feed channel 315 into manifold 330a of shaping structure 327 and spreads in the manifold in a direction generally transverse to a main direction of stream A flow indicated by an arrow located in connecting channel 370, and thereafter enters preconvergence channel 334. Similarly, streams B and C flow from feed channels 316,317 into manifolds 330b,330c of shaping structure 327, are spread in the manifolds in a direction generally transverse to a direction of flow indicated by the arrow located in connecting channel 370, and enter connecting channels 370, 370'.

Likewise, stream D flows from feed channel 318 into flow-shaping insert 303. Specifically, stream D enters manifold 342 and spreads in the manifold in a direction generally transverse to the main direction of stream D flow, and thereafter enters preconvergence channel 338 of the insert. Arm 328c of partition member 328 is beneficially disposed adjacent an interior side of the flow-shaping insert, and in this way provides a side wall 332c of the manifold and preconvergence channel of the insert.

A coextrusion structure 326 provides for shaping and convergence of streams A and D, and includes manifold 330a and preconvergence channel 334 of shaping structure 327, the flow-shaping channel provided by the flow-shaping insert, and flow convergence channel 346. As streams A and D exit from preconvergence channels 334,338 to merge in flow convergence channel 346, the shaped streams each advantageously have a width that corresponds to width w of channel 334, and upon merging, form shaped, melt-laminated stream 312, which includes layer interface 314 likewise having width w. Conveniently, a relatively greater extruder output is used for stream A than for stream D, as a result of which the flow volumes of streams A,D are substantially different as these streams form melt-laminate 312, which is thus characterized by, as indicated by FIG. 9, relatively greater volume of the A layer than the D layer.

Referring also to FIG. 9 and to the x-y-z coordinate system depicted, at inlets 352a,352b,352c of flow sequencer 350, streams 312,313,323, suitably shaped for melt-lamination, are conveniently disposed side-by-side along the x-axis. Within the flow sequencer, the shaped streams each flow generally in the main flow or z-direction, and the x-axis is generally in alignment with widths w,w',w". In accordance with the invention, the shaped streams are oriented and sequenced within sequencer 350 so that they are in a selected, stacked orientation along the y-axis prior to melt-lamination. Conveniently, only streams 312,323 are reoriented, the reorientation being along both the x-axis and y-axis. As the streams pass from flow sequencer 350 into channel 360, the shaped streams are melt-laminated within channel 360 along major surfaces thereof defined by an x-z plane, to generate continuous, generally planar interface boundaries 364 in a shaped layered composite 362 consisting of shaped layers stacked in the y-direction.

As indicated in FIG. 9, shaped layered stream 312 contributes the most to the volume of shaped layered composite 362, stream 313 contributes a smaller proportion to the volume, and stream 323 contributes the smallest proportion to the volume, thereby producing a layer thickness gradient. As before, the relative volume or mass can be controlled by relative volumetric or mass throughput of the flow streams. Conveniently, relatively greater extruder output is used for streams A,D than for streams B,C, and relatively greater extruder output is used for stream B than for stream C.

Flow sequencer 350 beneficially is an assembly of a plurality of plates 375,376,377,378 with surface channels (not shown) that combine to form the flow-sequencing channels. A skilled artisan by comparison to the details of FIG. 4, will readily understand suitable surface channel shapes, locations and orientations for constructing the flow-sequencing channels of sequencer 350.

Thereafter in accordance with the invention, shaped layered composite 362 exits from apparatus 310 through an exit slot 357, and, as in previous embodiments, is passed directly or indirectly into an appropriate conventional downstream extrusion die, from which exits a multilayer sheet product 369 of increased width, illustrated in FIG. 9. Like sheet product 69, sheet product 369 has a width W greater than a thickness T, and the interfaces generated after stream reorientation, are generally parallel to the sheet width, and to earlier-formed interface 314. Arrows located in channels 360 and 370 indicate a main direction of fluid flow until exit of shaped layered composite 362 from apparatus 310.

As previously indicated, a shaped layered composite may be converged with other streams prior to entry into the downstream extrusion die. In such case, flow sequencer removability may be of special benefit. For example, instead of converging composite 362 with a like composite having layer sequence C/B/D/A, a coherent mass having layer sequence C/B/D/A/D/A/B/C could be produced by removing flow sequencer 350, rotating the flow sequencer 180 degrees and reinserting the flow sequencer.

Figure 11:
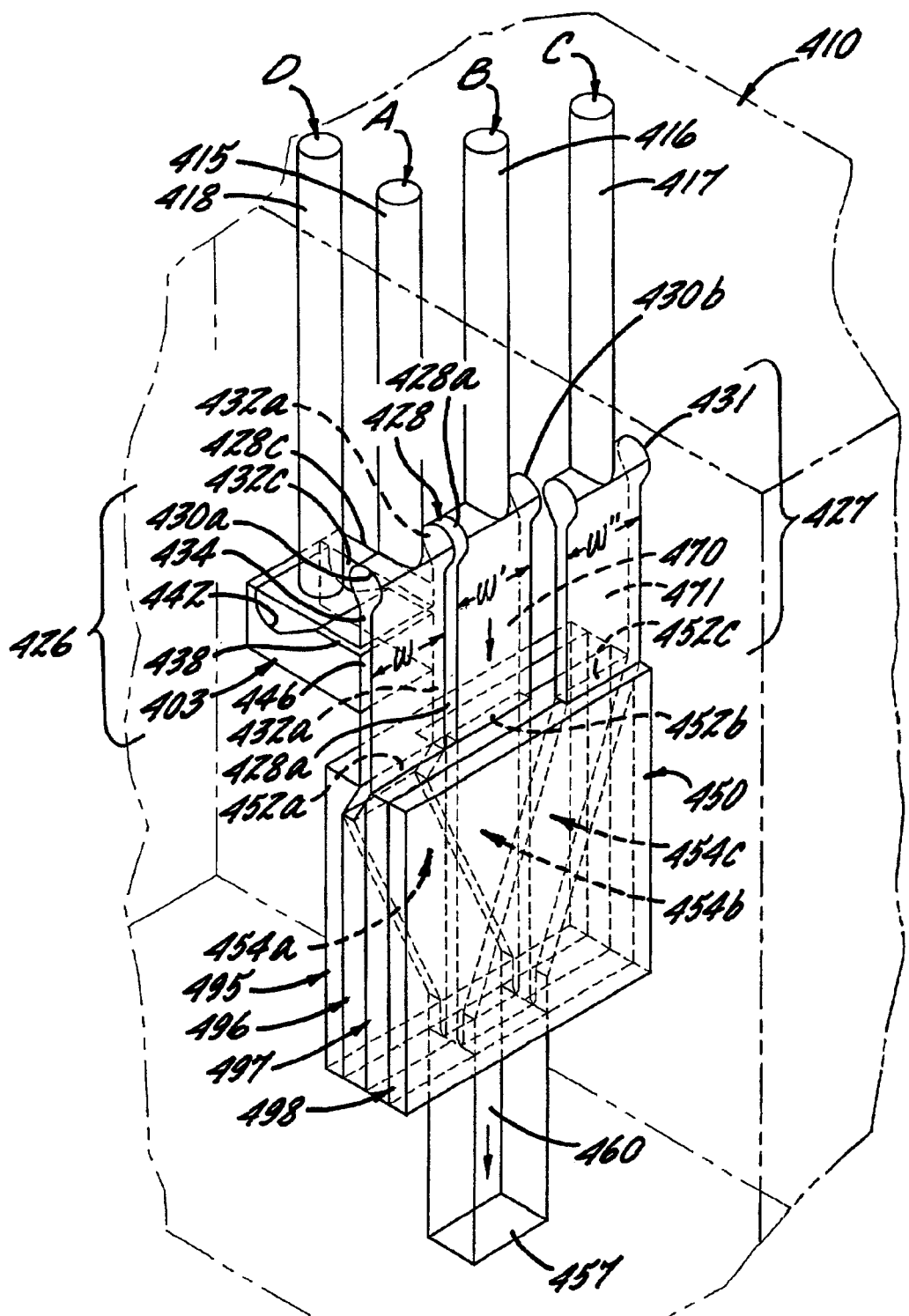
FIG. 11 is a perspective view of still another preferred embodiment.

With reference to FIG. 11, an apparatus 410 is shown that differs from apparatus 310 of FIG. 10 in significant respects, including a manifold 431, a connecting channel 471, and an inlet 452c offset respectively from manifolds 430a,430b, from channels 446,470, and from inlets 452a,452b. Thus, inlets 452a,452b,452c of flow sequencer 450 are no longer side-by-side, but, for purposes of this invention, are generally side-by-side. Furthermore, a different flow sequencing arrangement of channels 454a,454b,454c is shown. Also, apparatus 410 lacks a second partition member, and thus a flow-shaping structure 427 of apparatus 410 is beneficially partitioned by a removable partition plate into two, not three, generally equal portions in the transverse flow direction.

However, other aspects are similar including melt-laminating in interface generating channel 460, after stream reorientation in flow sequencer 450. Previously, certain of these and other aspects have been described; therefore, like parts have been designated with like numbers, and reference can be made to the pertinent, prior descriptions relative to apparatus 10 and 310.

If desired, the embodiment of FIG. 11 could be further modified so that inlet 452a is offset from inlet 452b in a direction opposite to inlet 452c. In such case, for purposes of this invention, flow sequencer inlets 452a,452b,452c would be generally side-by-side to one another, even though inlets 452a,452b,452c were offset from one another and in three parallel planes. Thus, "generally side-by-side" is meant for purposes of this invention, to include an arrangement of flow sequencer inlets that if not coplanar, would be side-by-side if the respective offset planes were aligned.

Having described the invention in detail and by reference to preferred embodiments thereof, it will be apparent that other modifications and variations are possible without departing from the scope of the invention defined in the appended claims.

What is claimed is:

1. Apparatus for producing a multilayered composite product comprising a coextrusion structure and a partition member, wherein said coextrusion structure is partitioned by said partition member into a first coextrusion substructure and a second coextrusion substructure, wherein said first coextrusion substructure comprises a first flow-shaping insert that comprises a transverse flow-providing manifold of a first flow-shaping channel wherein said first flow-shaping channel is in fluid communication with a first flow convergence channel, and wherein said second coextrusion substructure comprises a second flow-shaping channel in fluid communication with a second flow convergence channel, and downstream of and in fluid communication with said first flow convergence channel and said second flow convergence channel of said coextrusion structure, means for changing the relative orientation of a first flow stream and of a second flow stream to one another, comprising generally side-by-side inlets to a first flow-sequencing channel and a second flow-sequencing channel in fluid communication with an interface generating channel.

2. The apparatus of claim 1, wherein said partition member is a plate.

3. The apparatus of claim 2, wherein said second coextrusion substructure further comprises a third flow-shaping channel in fluid communication with said second flow convergence channel, wherein said second flow-shaping channel comprises a transverse-flow providing manifold, wherein said plate forms a wall portion of said first flow-shaping channel and a wall portion of said second flow-shaping channel, and wherein said wall portion of said first flow-shaping channel and said wall portion of said second flow-shaping channel are arranged to form a stream-dividing wall.

4. The apparatus of claim 2, wherein said plate and said first flow-shaping insert and said means for changing the relative stream orientation are individually removably disposed within said apparatus.

5. The apparatus of claim 1, wherein said inlets are disposed coplanar to one another.

6. Apparatus for producing a multilayered composite product comprising a first flow-shaping structure, a first flow-shaping insert that comprises a transverse flow-providing manifold of a first flow-shaping channel wherein said first flow-shaping channel is in fluid communication with a flow convergence channel, and a partition member,
wherein said first flow-shaping structure is partitioned by said partition member so as to comprise a second flow-shaping channel and a third flow-shaping channel, wherein said second flow-shaping channel is in fluid communication with said flow convergence channel, and a coextrusion structure is formed by said first flow-shaping channel, said second flow-shaping channel, and said flow convergence channel, and
downstream of and in fluid communication with said flow convergence channel and said third flow-shaping channel, means for changing the relative orientation of a first flow stream and of a second flow stream to one another, comprising generally side-by-side inlets to a first flow-sequencing channel and a second flow-sequencing channel in fluid communication with an interface generating channel.

7. The apparatus of claim 6, further comprising an additional partition member, wherein said first flow shaping structure is further partitioned by said additional partition member so as to comprise a fourth flow-shaping channel, said additional partition member being disposed between said third flow-shaping channel and said fourth flow-shaping channel.

8. The apparatus of claim 6, wherein said partition member is a plate, and wherein said first flow-shaping insert and said plate and said means for changing the relative stream orientation are individually removably disposed within said apparatus.

9. The apparatus of claim 8, wherein said second flow-shaping channel and said third flow-shaping channel each comprises a transverse-flow providing manifold, and wherein said elate forms a wall portion of said first flow-shaping channel.

10. The apparatus of claim 6, wherein said inlets are disposed coplanar to one another.

11. Apparatus for producing a multilayered composite product comprising a coextrusion structure and a partition member, wherein said coextrusion structure is partitioned by said partition member into a first coextrusion substructure and a second coextrusion substructure,
wherein said first coextrusion substructure comprises a first flow-shaping channel comprising a transverse-flow providing manifold wherein said transverse flow defines a width direction and said first flow-shaping channel is in fluid communication with a first flow convergence channel, and wherein said second coextrusion substructure comprises a second flow-shaping channel in fluid communication with a second flow convergence channel, and
downstream of and in fluid communication with said first flow convergence channel and said second flow convergence channel of said coextrusion structure, means for changing the relative orientation of a first flow stream and of a second flow stream to one another, comprising a first inlet to a first flow-sequencing channel and a second inlet to a second flow-sequencing channel in fluid communication with an interface generating channel, wherein said first inlet and said second inlet are disposed generally side-by-side in said width direction.

12. The apparatus of claim 11, wherein said partition member is a plate.

13. The apparatus of claim 11, wherein said first coextrusion substructure further comprises a first flow-shaping insert that comprises said transverse flow-providing manifold.

14. The apparatus of claim 12, wherein said first coextrusion substructure further comprises a first flow-shaping insert that comprises said transverse flow-providing manifold, and wherein said plate and said first flow-shaping insert and said means for changing the relative stream orientation are individually removably disposed within said apparatus.

15. The apparatus of claim 11, wherein said inlets are disposed coplanar to one another.

16. Apparatus for producing a multilayered composite product comprising a first flow-shaping structure, a first flow-shaping channel in fluid communication with a flow convergence channel, and a partition member,
wherein said first flow-shaping structure is partitioned by said partition member so as to comprise a second flow-shaping channel and a third flow-shaping channel, wherein said second flow-shaping channel comprises a transverse flow-providing manifold wherein said transverse flow defines a width direction and said second flow-shaping channel is in fluid communication with said flow convergence channel, and wherein a coextrusion structure is formed by said first flow-shaping channel, said second flow-shaping channel, and said flow convergence channel, and
downstream of and in fluid communication with said flow convergence channel and said third flow-shaping channel, means for changing the relative orientation of a first flow stream and of a second flow stream to one another, comprising a first inlet to a first flow-sequencing channel and a second inlet to a second flow-sequencing channel in fluid communication with an interface generating channel, wherein said first inlet and said second inlet are disposed generally side-by-side in said width direction.

17. The apparatus of claim 16, further comprising an additional partition member, wherein said first flow shaping structure is further partitioned by said additional partition member so as to comprise a fourth flow-shaping channel, said additional partition member being disposed between said third flow-shaping channel and said fourth flow-shaping channel.

18. The apparatus of claim 16, wherein said partition member is a plate.

19. The apparatus of claim 16, further comprising a first flow-shaping insert that provides a portion of said first flow-shaping channel.

20. The apparatus of claim 18, further comprising a first flow-shaping insert that provides a portion of said first flow-shaping channel, wherein said plate and said first flow-shaping insert and said means for changing the relative stream orientation are individually removably disposed within said apparatus.

21. The apparatus of claim 16, wherein said inlets are disposed coplanar to one another.

\* \* \* \* \*